United States Patent [19]

Kim et al.

[11] Patent Number: 4,575,086
[45] Date of Patent: Mar. 11, 1986

[54] TRACKBALL DEVICE

[75] Inventors: Syng N. Kim, Hoffman Estates; Max Wiczer, Skokie, both of IL

[73] Assignee: Wico Corporation, Niles, Ill.

[21] Appl. No.: 609,598

[22] Filed: May 14, 1984

[51] Int. Cl.⁴ .................... A63B 71/04; G05G 9/00
[52] U.S. Cl. ............................ 273/148 B; 74/471 XY
[58] Field of Search .............. 273/148 B; 308/184 R

[56] References Cited

U.S. PATENT DOCUMENTS

| | | | |
|---|---|---|---|
| 3,987,685 | 10/1976 | Opocensky | 340/710 X |
| 4,404,865 | 9/1983 | Kim | 273/148 B X |
| 4,439,648 | 3/1984 | Reiner et al. | 273/148 B X |

FOREIGN PATENT DOCUMENTS 2097868  11/1982  United Kingdom ............ 308/184 R Primary Examiner—Richard C. Pinkham
Assistant Examiner—Gary Jackson
Attorney, Agent, or Firm—Emrich & Dithmar

[57] ABSTRACT

The trackball device comprises cylindrical first and second supports. First and second code wheels are respectively coupled to the supports and are rotatable therewith. First and second reader means are respectively associated with the first and second code wheels for generating control signals. A ball is seated on the supports. The second support, both of the reader means, the second code wheel and the ball all lie on the same side of the first support.

7 Claims, 5 Drawing Figures

TRACKBALL DEVICE

BACKGROUND OF THE INVENTION

The present invention relates to a cursor position control device of the type commonly referred to as a trackball device. Such devices are used, for example, to control the movement of a cursor of a video display as in a video game.

Trackball devices include a housing having a circular opening therein and a plurality of rotatable supports, at least two of which are respectively rotatable about perpendicular axes. A ball is loosely seated on the supports, with a portion of the ball projecting through the opening so that the user can manually rotate the ball. The rotatable supports respectively respond to corresponding components of rotational movement of the ball. The supports are respectively connected to reader means which produce signals indicative of the speed and direction of rotation of the supports. The two perpendicular supports respectively correspond to the x and y directions of the movement of the cursor so that speed and direction of movement of the cursor in the x and y directions correspond respectively to the speed and direction of rotation of the associated supports.

In prior trackball devices, the components thereof have been arranged so as to necessitate a large housing. Furthermore, prior trackball devices have not completely solved the problem of friction in the rotation of the supports while still addressing the problem of rattling and poor shock and impact resistance.

SUMMARY OF THE INVENTION

It is therefore an important object of this invention to provide a trackball device with a compact configuration of the supports and the reader means for efficient use of space and materials.

It is another object of this invention to provide a trackball device which exhibits improved shock and impact resistance and smooth operation, while still providing reduced friction in the rotation of the supports and the trackball.

These and other objects of the invention are attained by providing a trackball position control device comprising a housing having a circular opening therein, a generally cylindrical first support mounted for rotation in the housing and having a first axis of rotation, a generally cylindrical second support mounted for rotation in the housing and having a second axis of rotation, first and second code wheels respectively coupled to the supports and rotatable therewith, first and second reader means respectively associated with the first and second code wheels for generating control signals, a ball seated on the supports and having a portion projecting through the opening for manual rotation by the user, the second support and both of the reader means and the second code wheel and the ball all lying on the same side of the first axis, and a plurality of mounting means each including a bearing and bias means, the plurality of mounting means being constructed and arranged to allow movement of the first and second supports in directions toward and away from the plane of the opening and preventing movement of each support in directions parallel to the plane of the opening, the first and second supports each being carried between a pair of associated mounting means, the first and second supports having journals at the ends thereof respectively engaging the bearing surfaces associated therewith, the configuration of the journals and the bearing surfaces being such as to cause each journal to make substantially point contact with its associated bearing surface, the bias means being carried in the mounting means and resiliently urging each bearing surface and the associated support carried therebetween toward the plane of the opening.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
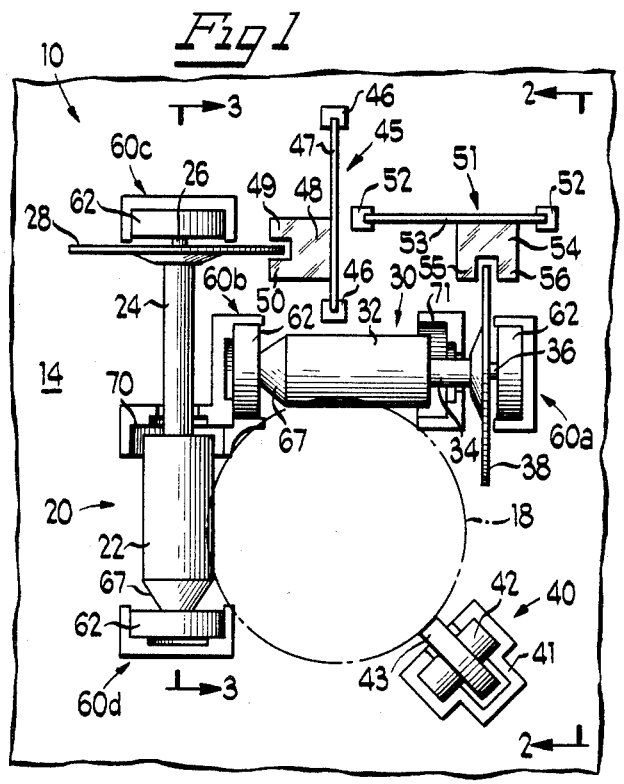
FIG. 1 is a fragmentary, top plan view of the trackball device with the cover thereof removed.
Figure 2:
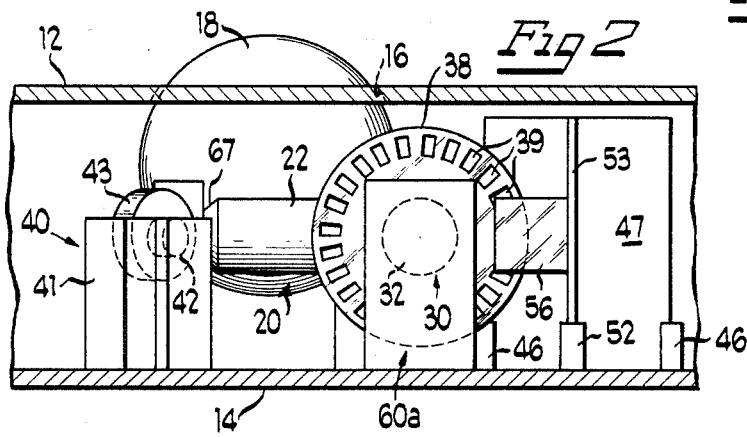
FIG. 2 is a fragmentary view in vertical section taken along the line 2—2 in FIG. 1 with the cover in place.
Figure 3:
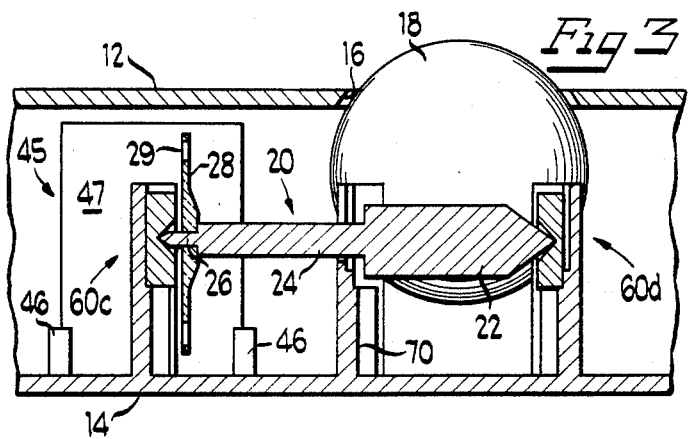
FIG. 3 is a fragmentary view in vertical section taken along the line 3—3 in FIG. 1 with the cover in place.

Referring now to FIGS. 1 and 2 of the drawings, there is illustrated a trackball device generally designated by the numeral 10. The trackball device 10 is mounted in a housing defined in part by a top wall 12 and a bottom wall 14. Such housing may incorporate other devices, so that space is at a premium. In the top wall 12 is an opening 16.

The trackball device 10 comprises a ball 18 protruding through the opening 16. The trackball device 10 further comprises one-piece, plastic shafts 20 and 30 which are oriented such that their axes are perpendicular to each other. The shaft 20 includes a support portion 22, a connecting portion 24 and an attachment portion 26. The support portion 22 is a larger diameter cylinder that supports the ball 18. A code wheel 28 is attached to the attachment portion 26 and is rotatable therewith. The connecting portion 24 is a smaller diameter cylinder located between the support portion 22 and the attachment portion 26. The support portion 22, the connecting portion 24 and the attachment portion 26 are coaxial. The shaft 20 is rotatably supported by a pair of mounting structures which will be described hereinafter.

The shaft 30 includes a support portion 32, a connecting portion 34, and an attachment portion 36. The support portion 32 is a larger diameter cylinder that supports the ball 18. A code wheel 38 is attached to the attachment portion 36 and is rotatable therewith. The connecting portion 34 is a smaller diameter cylinder located between the second support portion 32 and the second attachment portion 36. The support portion 32, the connecting portion 34 and the attachment portion 36 are coaxial. The shaft 30 is rotatably supported by a pair of mounting structures as will be described hereinafter.

The trackball device 10 further includes a ball support 40 which includes a pillow block 41 into which is journaled a short, cylindrical shaft 42 which carries an idler wheel 43.

The code wheel 28 is associated with a reader means 45. The reader means 45 includes a printed circuit board 47, which is mounted in a pair of upstanding channels 46. The circuit board 47 has electrical components thereon connected to an associated source of electric power and control circuit (not shown). The reader means 45 also includes a U-shaped housing 48 having legs 49 and 50.

The code wheel 28 is a thin disk with a plurality of generally rectangular apertures 29 therethrough equiangularly spaced therearound adjacent to the periphery thereof. The code wheel 28 is dimensioned so that the apertured portion thereof projects into the U-shaped housing 48. The housing 48 carries a transducer of standard construction. Specifically in the leg 49 is an LED light source and in the leg 50 is a photodetector. In operation, light from the LED passes through the apertures 29 in the code wheel 28 to the photodetector to provide a series of pulse signals as the code wheel 28 rotates.

The code wheel 38, having apertures 39, is similarly associated with a reader means 51. The reader means 51 includes a printed circuit board 53 which is mounted in a pair of upstanding channels 52. The reader means also includes a U-shaped housing 54 having legs 55 and 56. The reader means 51 and the code wheel 38 function the same as the reader means 45 and the code wheel 28 described above.

In use, the first support portion 22, the second support portion 32 and the idler wheel 43 support the ball 18. The ball 18 is dimensioned so that a portion thereof projects through the opening 16. The protruding portion of the ball 18 is rotated manually in the usual manner by the user. The free seating of the ball 18 allows for rotation in any direction. Upon rotation of the ball 18, the support portions 22 and 32 and the idler wheel 43 will be rotated in response to a component of rotational movement of the ball 18. The rotation of the support portions 22 and 32 causes a resultant rotation of the respective code wheels 28 and 38. The rotation of the code wheels 28 and 38 produces code signals registered in the respective reader means 45,51 which controls movement of a cursor or other element in an xy plane. The speed and direction of movement in the x or y directions are proportional to the speed and direction of rotation of the corresponding one of the support portions 22 or 32.

Figure 5:
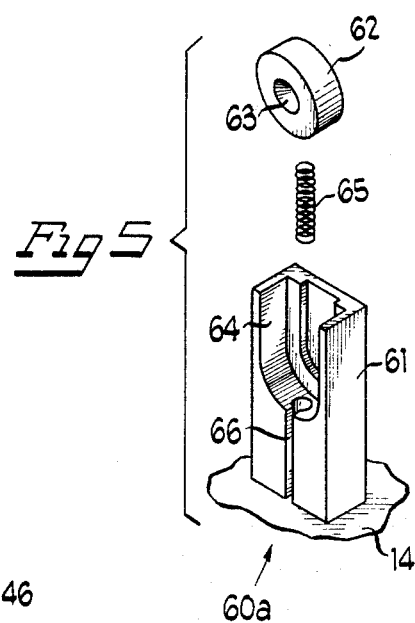
FIG. 5 is an exploded view of a mounting means showing the bearing surface and bias means.

Referring now to FIG. 5, there is shown a mounting structure 60a. The mounting structure 60a includes a housing 61 having a bearing slot 64 and a groove 66. Positioned in each bearing slot 64 is a bearing disk 62 having a bearing surface 63. Positioned in the groove 66 is a bias means or spring 65. The spring 65 contacts the bearing disk 62 urging the bearing disk 62 towards the top wall 12 of the trackball device 10.

As shown in FIG. 1, the shaft 30 is rotatably mounted between the mounting structure 60a and a mounting structure 60b. The mounting structure 60b is identical to the mounting structure 60a shown in FIG. 5.

Figure 4:
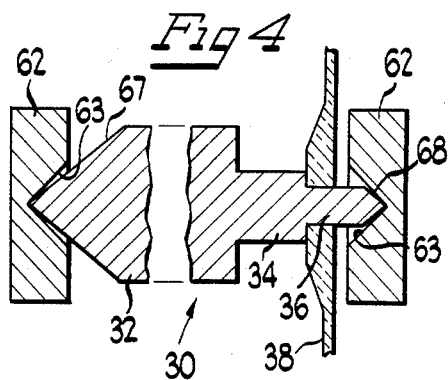
FIG. 4 is an enlarged fragmentary elevation of a shaft with its associated bearings.

Referring now to FIG. 4, the details of the mounting of the shaft 30 will be described. At the distal end of the support portion 32 is a large journal 67. At the distal end of the attachment portion 36 is a small journal 68. The large journal 67 and the small journal 68 each engage a bearing surface 63 with point contact for minimal friction upon rotation.

The shaft 20 is mounted between a mounting structure 60c and a mounting structure 60d. Each of the structures 60c and 60d is identical to the structure 60a shown in FIG. 5. The shaft 20 is mounted in the same manner as the shaft 30 shown in FIG. 4, with the journals 67 and 68 engaging the respective bearing surface 63 in each mounting structure 60c and 60d. The only difference is that the connecting portion 24 is longer than the connecting portion 34 shown in FIG. 4, for reasons to be explained.

The point contact between the journals 67 and 68 and the respective bearing surfaces 63 allows for rotation of the ball 18 with a minimal amount of frictional resistance. Shock and impact resistance are greatly increased by the bearing disks 62 being urged upward in the bearing slots 64 by the respective springs 65. Downward force on the ball 18 causes a downward motion of the ball 18, the shafts 20 and 30, and the respective bearing disks 62. The springs 65 operate to create an opposite force on the disks 62, the shafts 20,30 and the ball 18, thereby reducing shock and impact on the entire device 10. The excessive downward movement of the ball 18 is prevented by stop blocks 70 and 71. The stop block 70 engages the support portion 22 and the stop block 71 engages the support portion 32 when an effort is made to depress the ball 18 too far. At rest, the springs 65 cause the ball 18 to rest against the perimeter of the opening 16.

An important aspect of the present invention is the compact configuration of the trackball device 10. The compact configuration is accomplished in part by the connecting portion 24 being longer than the connecting portion 34. This allows the the mounting structure 60b to be positioned adjacent the connecting portion 24, between the code wheel 28 and the larger diameter of the support portion 22 with the axis of the shaft 30 perpendicular to the axis of the shaft 20.

The reader means 51 lies on the opposite side of the shaft 30 from the ball 18 with the printed circuit board 53 lying parallel to the axis of the shaft 30 and the code wheel 38 extending between the legs 55 and 56 of the U-shaped housing 54. The reader means 45 lies between the second reader means 51 and the axis of the shaft 20 adjacent the mounting structure 60c. The printed circuit board 47 lies parallel to the axis of the shaft 20 with the code wheel 28 extending between the legs 49 and 50 of the U-shaped housing 48. The compact configuration of the above components allows for significant savings of space and materials over prior art trackball devices.

From the foregoing, it can be seen that there is provided an improved trackball device with a more compact configuration for savings of space and materials. Also, provided is an improved trackball device which has minimal friction upon rotation of the ball while still reducing rattling and increasing shock and impact resistance.

We claim:

1. A trackball device comprising a housing having a circular opening therein, a generally cylindrical first support mounted for rotation in said housing and having a first axis of rotation, a generally cylindrical second support mounted for rotation in said housing and having a second axis of rotation, first and second code wheels respectively coupled to said supports and rotatable therewith, first and second reader means respectively associated with said first and second code wheels for generating control signals, a ball seated on said supports and having a portion projecting through said opening for manual rotation by the user, said second support and both of said reader means and said second code wheel and said ball all lying on the same side of said first axis, a plurality of mounting means each including bias means, each of said first and second supports being carried between a pair of said mounting means, said mounting means being constructed and arranged to allow movement of said first and second supports in directions toward and away from the plane of said opening and preventing movement of each of said supports in directions parallel to the plane of said opening, said bias means resiliently urging each of said supports toward the plane of said opening, and fixed stop means disposed between said mounting means of each of said pairs of mounting means and respectively engageable with said first and second supports for limiting movement thereof away from the plane of said opening.

2. The trackball device of claim 1, wherein said first and second axes are perpendicular.

3. A trackball device as described in claim 1, wherein said first and second reader means are on the opposite side of said second axis from said ball.

4. A trackball device as described in claim 3, wherein said first reader means lies between said first axis and said second reader means.

5. The trackball device of claim 1, and further comprising a third rotatably mounted support for said ball.

6. A trackball device of claim 1, wherein said first and second supports are made of plastic.

7. A trackball device comprising a housing having a circular opening therein, a generally cylindrical first support mounted for rotation in said housing and having a first axis of rotation, a generally cylindrical second support mounted for rotation in said housing and having a second axis of rotation, first and second code wheels respectively coupled to said supports and rotatable therewith, first and second reader means respectively associated with said first and second code wheels for generating control signals, a ball seated on said supports and having a portion projecting through said opening for manual rotation by the user, said second support and both of said reader means and said second code wheel and said ball all lying on the same side of said first axis, and a plurality of mounting means, said plurality of mounting means each including a bearing surface and bias means, said plurality of mounting means being constructed and arranged to allow movement of said first and second supports in directions toward and away from the plane of said opening and preventing movement of each said supports in directions parallel to the plane of said opening, each of said first and second supports being carried between a pair of said mounting means, said first and second supports having journals at the ends thereof respectively engaging said bearing surfaces associated therewith, the configuration of said journals and said bearing surfaces being such as to cause each said journal to make substantially point contact with its associated bearing surface, said bias means being carried in the mounting means and resiliently urging each of said bearing surfaces and the associated support carried therebetween toward the plane of said opening, and fixed stop means disposed between said mounting means of each of said pairs of mounting means and respectively engageable with said first and second supports for limiting movement thereof away from the plane of said opening.

* * * * *